United States Patent
Naruse et al.

(10) Patent No.: US 7,398,406 B2
(45) Date of Patent: Jul. 8, 2008

(54) DATA PROCESSOR

(75) Inventors: Takanobu Naruse, Nagoya (JP);
Hirokatsu Noguchi, Yamagata (JP);
Kazuhide Kawade, Kiyosu (JP);
Yoshiyuki Matsumoto, Takasaki (JP)

(73) Assignee: Renesas Technology Corp., Tokyo (JP)

( * ) Notice: Subject to any disclaimer, the term of this patent is extended or adjusted under 35 U.S.C. 154(b) by 312 days.

(21) Appl. No.: 11/130,218

(22) Filed: May 17, 2005

(65) Prior Publication Data
US 2005/0268130 A1 Dec. 1, 2005

(30) Foreign Application Priority Data
May 28, 2004 (JP) .............................. 2004-158822

(51) Int. Cl.
*G06F 1/00* (2006.01)
*G06F 1/26* (2006.01)
*G06F 11/00* (2006.01)

(52) U.S. Cl. .................. 713/322; 713/300; 713/320; 713/500; 713/501; 714/100

(58) Field of Classification Search .............. 713/300, 713/320, 322, 500, 501; 714/34, 100
See application file for complete search history.

(56) References Cited

U.S. PATENT DOCUMENTS

| 5,778,237 | A |   | 7/1998  | Yamamoto et al. ..... 395/750.04 |
| 5,822,596 | A | * | 10/1998 | Casal et al. .................. 713/322 |
| 5,875,120 | A | * | 2/1999  | Matsushima et al. ........ 713/321 |
| 5,978,864 | A | * | 11/1999 | Hetherington et al. ........ 710/18 |
| 6,460,125 | B2 | * | 10/2002 | Lee et al. ..................... 711/167 |
| 7,000,130 | B2 | * | 2/2006  | Adachi ........................ 713/322 |

FOREIGN PATENT DOCUMENTS

| JP | 05-333963 | 12/1993 |
| JP | 7-287699  | 10/1995 |
| JP | 09-231195 | 9/1997  |

* cited by examiner

*Primary Examiner*—Mark Connolly
(74) *Attorney, Agent, or Firm*—Miles & Stockbridge P.C.

(57) ABSTRACT

It is aimed at providing a data processor capable of suppressing a sudden current change from the viewpoint of a synchronization clock. A data processor 1 comprises a clock pulse generation circuit and a circuit module operating on input clock signal CLKi output from the clock pulse generation circuit. In case of restoration from a power-on reset period or a standby state, the clock pulse generation circuit stepwise changes frequencies of the clock signal from low to high frequencies. This makes it possible to prevent a power supply current from suddenly increasing in case of restoration from the power-on reset period or the standby state.

5 Claims, 10 Drawing Sheets

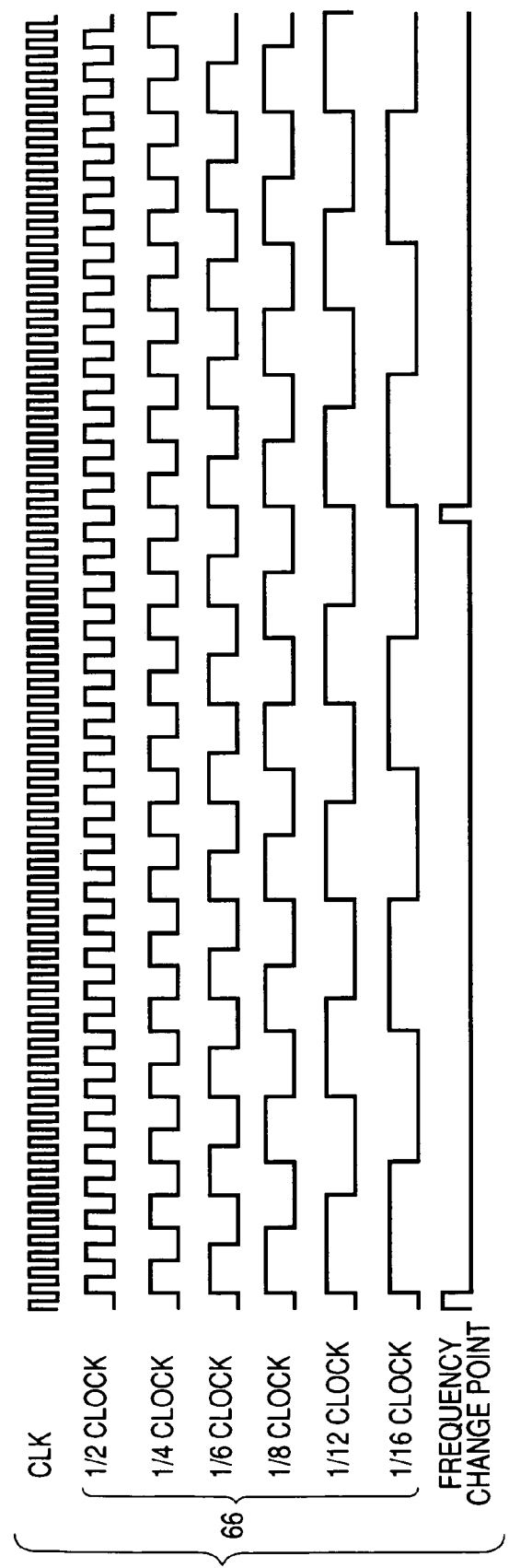

DATA PROCESSOR

CROSS-REFERENCE TO RELATED APPLICATION

The present application claims priority from Japanese patent application No. 2004-158822 filed on 28 May, 2004, the content of which is hereby incorporated by reference into this application.

BACKGROUND OF THE INVENTION

The present invention relates to a technology effectively applicable to a data processor having a clock pulse generation circuit and particularly to a data processor which operates at low voltages and consumes relatively large power.

Patent document 1 describes the microcomputer's power-on reset technology in accordance with a power-on sequence. Patent document 2 describes the microcomputer's clock generation circuit having variable frequencies. There is considered a case of changing a frequency and an operating voltage. When the clock signal frequency and the operating voltage are increased, an attempt is made to prevent malfunction by avoiding an instance of increasing the frequency before increasing the operating voltage. Patent document 3 describes that the microprocessor and the peripheral circuit completely operate on the time-sharing basis in consideration for an increase in the power consumption when clocks are simultaneously supplied to the microprocessor and the peripheral circuit.

[Patent document 1]
Japanese Unexamined Patent Publication No. Hei 5 (1993)-333963

[Patent document 2]
Japanese Unexamined Patent Publication No. Hei 7 (1995)-287699

[Patent document 3]
Japanese Unexamined Patent Publication No. Hei 9 (1997)-231195

SUMMARY OF THE INVENTION

As data processors have come to consume low power, there is an increasing demand for low power voltages. By contrast, power consumption tends to increase more and more as the system-on-chip (SOC) trend increases physical scales and requires sophisticated features. The inventors found it difficult to stabilize the system power supply when a situation to turn on the power or release a standby state is accompanied by a sudden, large current change. For example, let us consider a microcomputer mounted with many circuit modules such as a synchronous memory controller and a graphic controller that are clock-synchronized with the CPU. When a power-on reset or a standby release occurs, a power-on sequence or the like simultaneously supplies clocks to respective circuit modules. In this case, a consumption current suddenly changes up to several hundreds of milliamperes. A low-voltage power supply has not enough current supply capability to follow such sudden increase in the consumption current. The power voltage may be greatly undershot. By contrast, a power failure may occur or a standby condition may be enabled to suddenly stop supplying the power or clocks. In such case, a voltage overshoot may occur to exceed the rating. Stabilizing the system power supply is considered difficult when using a data processor that operates at low voltages and is expected to be subject to a sudden current change. None of the above-mentioned patent documents treats such viewpoint concerning the data processor's power consumption.

It is therefore an object of the present invention to provide a data processor capable of suppressing a sudden current change from the viewpoint of synchronization clocks.

These and other objects and novel features of the invention may be readily ascertained by referring to the following description and appended drawings.

The following summarizes representative aspects of the present invention disclosed in this application.

That is, a data processor (semiconductor device) comprises a clock pulse generation circuit and a circuit module operating on an input clock signal output from the clock pulse generation circuit. In case of restoration from a power-on reset period or a standby state (standby operation, standby mode) to Active operation (Active mode in which the circuit module can be operation), the clock pulse generation circuit stepwise changes frequencies of the clock signal from low to high frequencies. This makes it possible to prevent a power supply current from suddenly increasing in case of restoration from the power-on reset period or the standby state.

Further, in case of entry from active operation (active mode) to a power-down (power down operation) or standby state (standby operation, standby mode), the clock pulse generation circuit stepwise changes frequencies of the clock signal supplied to the circuit module from high to low frequencies. This makes it possible to prevent a power supply current from suddenly decreasing in case of entry to a power-down or standby state.

According to an embodiment of the present invention, the clock pulse generation circuit comprises a PLL circuit (phase locked loop circuit) and a divider. The divider comprises a plurality of dividing circuits, a selection circuit to select outputs from the dividing circuit, and a frequency control circuit to control the selection circuit. In case of restoration from the power-on reset period or standby state, the frequency control circuit controls the selection circuit to select output states of the dividing circuit so as to stepwise change frequencies of the clock signal from low to high frequencies. In case of entry to a power-down or standby state, the frequency control circuit further controls the selection circuit to select output states of the dividing circuit so as to stepwise change frequencies of the clock signal from high to low frequencies.

According to another embodiment of the present invention, the frequency control circuit receives a reset signal supplied from outside the data processor, responds to a reset signal's reset release instruction, completes a process to stepwise change frequencies of the clock signal from low to high frequencies, and then executes internal reset release. Likewise, the frequency control circuit is supplied with a standby signal, responds to the standby signal's instruction to enter a standby state, completes a process to stepwise change frequencies of the clock signal from high to low frequencies, and then stops supplying clock signals to the circuit module. The frequency control circuit is supplied with a power-down signal, responds to the power-down signal's instruction to enter a power-down state, completes a process to stepwise change frequencies of the clock signal from high to low frequencies, and then executes a power-down process.

According to yet another embodiment of the present invention, the circuit module includes a central processing unit. The circuit module includes a synchronous DRAM (synchronous random access memory) controller, a display controller, and a rendering controller.

The following summarizes representative effects of the present invention disclosed in this application.

Clock signal frequencies are stepwise changed when the power-on reset or standby state is released or when the power-down or standby state takes effect. It is possible to suppress a sudden current change. Consequently, the system using the image processor can easily stable the power supply.

BRIEF DESCRIPTION OF THE DRAWINGS

FIG. 10 illustrates frequency change points in FIGS. 8 and 9.

DETAILED DESCRIPTION OF THE PREFERRED EMBODIMENTS

Figure 1:
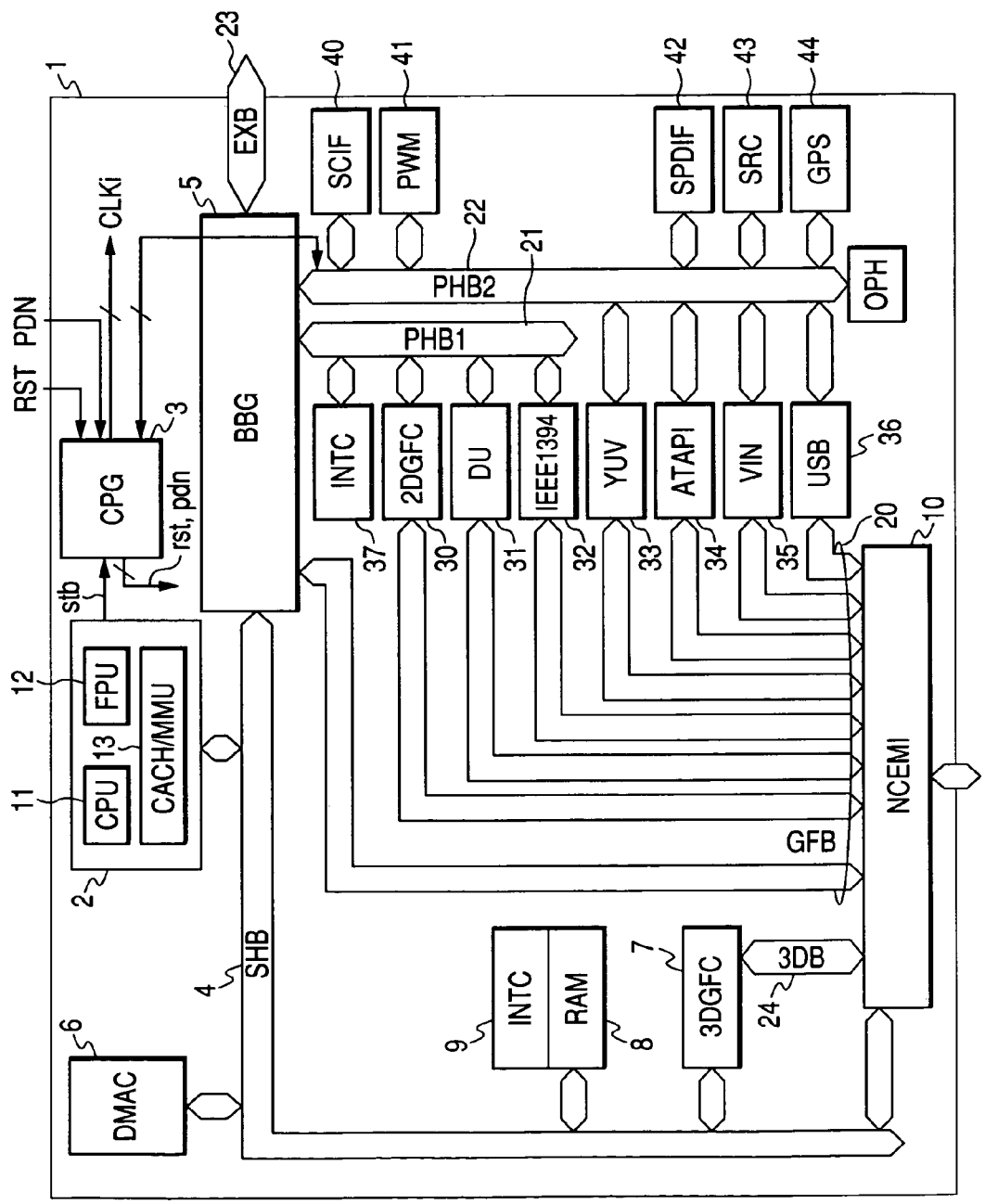
FIG. 1 is a block diagram showing an image processor according to an embodiment of the present invention.

FIG. 1 exemplifies an image processor (graphic processor) according to an embodiment of the present invention. The image processor in FIG. 1 is formed on a single semiconductor substrate (semiconductor chip) such as monocrystal silicon in accordance with the complementary MOS (CMOS) integrated circuit manufacturing technology, although not specifically specified. For example, the image processor has image processing and audio processing functions needed for car navigation, a DDR-SDRAM (double data rate synchronous dynamic random access memory) interface, and the like.

The image processor 1 contains a processor core 2 and a clock generation circuit (CPG) 3. The processor core is connected to a super highway bus (SHB) 4. The super highway bus connects with a bus bridge circuit (BBRG) 5, a direct memory access controller (DMAC) 6, a 3D engine (3DGFC) 7 for 3D image processing such as rendering 3D images, RAM 8, an interrupt controller (INTCF) 9, and a DDR-SDRAM memory controller (NCEMI) 10. The processor core 2 contains a central processing unit (CPU) 11 to execute fetched instructions, a floating point processing unit (FPU) 12, and cache/memory management (CACH/MMU) 13. DDR-SDRAM (not shown) is connected to the DDR-SDRAM memory controller (NCEMI) 10 and is used as main memory or frame buffer for the CPU 11. The bus bridge circuit 5 connects with a first peripheral bus (PBF) 21, a second peripheral bus (PBS) 22, and an external bus (EXB) 23. The 3D engine 7 is connected to the DDR-SDRAM memory controller (NCEMI) 10 via a 3D bus (3 DB) 24. The DDR-SDRAM memory controller (NCEMI) 10 further connects with a graphic bus (GFB) 20.

The super highway bus 4 is assumed to be a multi-master bus or a split transaction bus. The circuit modules connected to the super highway bus 4 each have a master port and a slave port independently of each other. A local circuit module issues a read/write transfer request as an instruction from the master port. A transfer request from a remote circuit module is arbitrated in a bus arbitration circuit and then is notified to the slave port to execute a bus transaction. Though not shown in FIG. 1, the bus arbitration circuit is disposed in the middle of the super highway bus 4. According to this multi-master bus control system, the super highway bus 4 enables all combinations of transfer between the circuit modules connected to it. For example, it is possible to perform the transfer and the like between the CPU 11 and the DMAC 6, between the bus bridge circuit 5 and the NCEMI 10, and between the bus bridge circuit 5 and the CPU 11.

The 3DGFC 7 connected to the 3D bus 24 receives image processing commands such as a 3D rendering command from the CPU 11 via the super highway bus 4 to execute a 3D rendering process. Via the NCEMI 10, rendering processes are applied to a frame buffer area in the DDR-SDRAM (not shown).

The graphic bus 20 connects with a 2D engine (2DGFC) 30 for 2D image processing, a display control circuit (DU) 31, a serial interface circuit (IEEE1394) 32, a color space conversion unit (YUV) 33, an AT attachment packet interface circuit (ATAPI) 34, a video signal input circuit (VIN) 35, and a universal serial bus function controller (USB) 36. The display control circuit 31 provides control to sequentially read image data rendered in the frame buffer area and output the image data to a raster scan display synchronously with display timings. The video signal input circuit 35 inputs digital video signals. The ATAPI 34 provides control to interface with disk drive apparatuses such as a hard disk drive, a DVD or CD-ROM drive, and the like.

Like the super highway bus 4, the graphic bus 20 is assumed to be a multi-master bus. The bus' source or destination always corresponds to the DDR-SDRAM memory controller 10. That is, the bus bridge circuit 5, the 2DGFC 30, the DU 31, the serial interface circuit 32, the YUV 33, the ATAPI 34, the VIN 35, and the USB 36 only transfer data to and from the DDR-SDRAM via the DDR-SDRAM interface 10. The image-oriented circuit module 30 (2DGFC) needs to process images in its circuit block and then once store the data in DDR-SDRAM. Alternatively, data in the DDR-SDRAM needs to be transferred to the DU 31. All transfer operations are constructed to always pass through the DDR-SDRAM controller 10.

The first peripheral bus 21 connects with the INTC 37, the 2DGFC 30, the DU 31, and the serial interface circuit 32.

The second peripheral bus 22 connects with an asynchronous serial communication interface circuit (SCIF) 40, a pulse width change timer (PWM) 41, an IEC60958 audio controller (SPDIF) 42, a source rate converter (SRC) 43, a GPS (Global Positioning System) search/tracking engine (GPS) 44, the clock generation circuit 3, and the other peripheral circuits (OPH).

The first peripheral bus 21 and the second peripheral bus 22 are single-master 32-bit buses. The bus bridge circuit 5 works as a bus master.

The CPU 11 represents a 32-bit CPU, for example. Data is processed in units of 32 bits. The CPU 11 has the super-scalar architecture to issue a plurality of instructions per cycle, providing instruction execution capability approximately twice as much as the operating frequency. That is, the CPU 11 has a so-called 2-way super-scalar architecture. Corresponding to this, the super highway bus 4 is constructed to be a 64-bit bus. Accordingly, the CPU 11 can concurrently execute two instructions. The CPU 11 can provide two sets of 32-bit data and transfer the provided two sets of data totaled to 64 bits to the super highway bus 4 at one bus cycle. The CPU 11 can read 64-bit data from the super highway bus 4 at one bus cycle and concurrently process high-order 32 bits and low-order 32 bits independently of each other.

Figure 2:
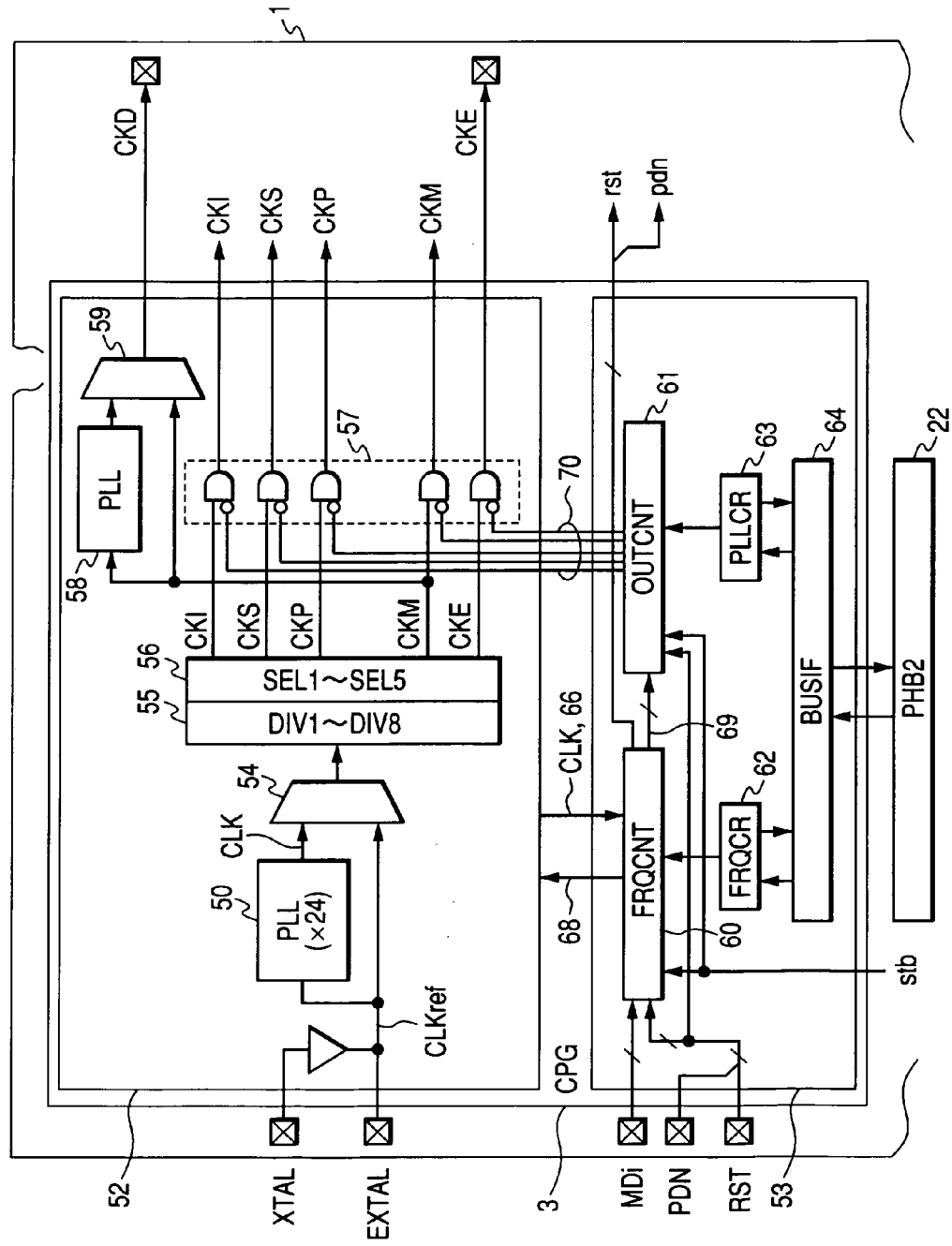
FIG. 2 is a block diagram exemplifying a clock generation circuit.
Figure 3:
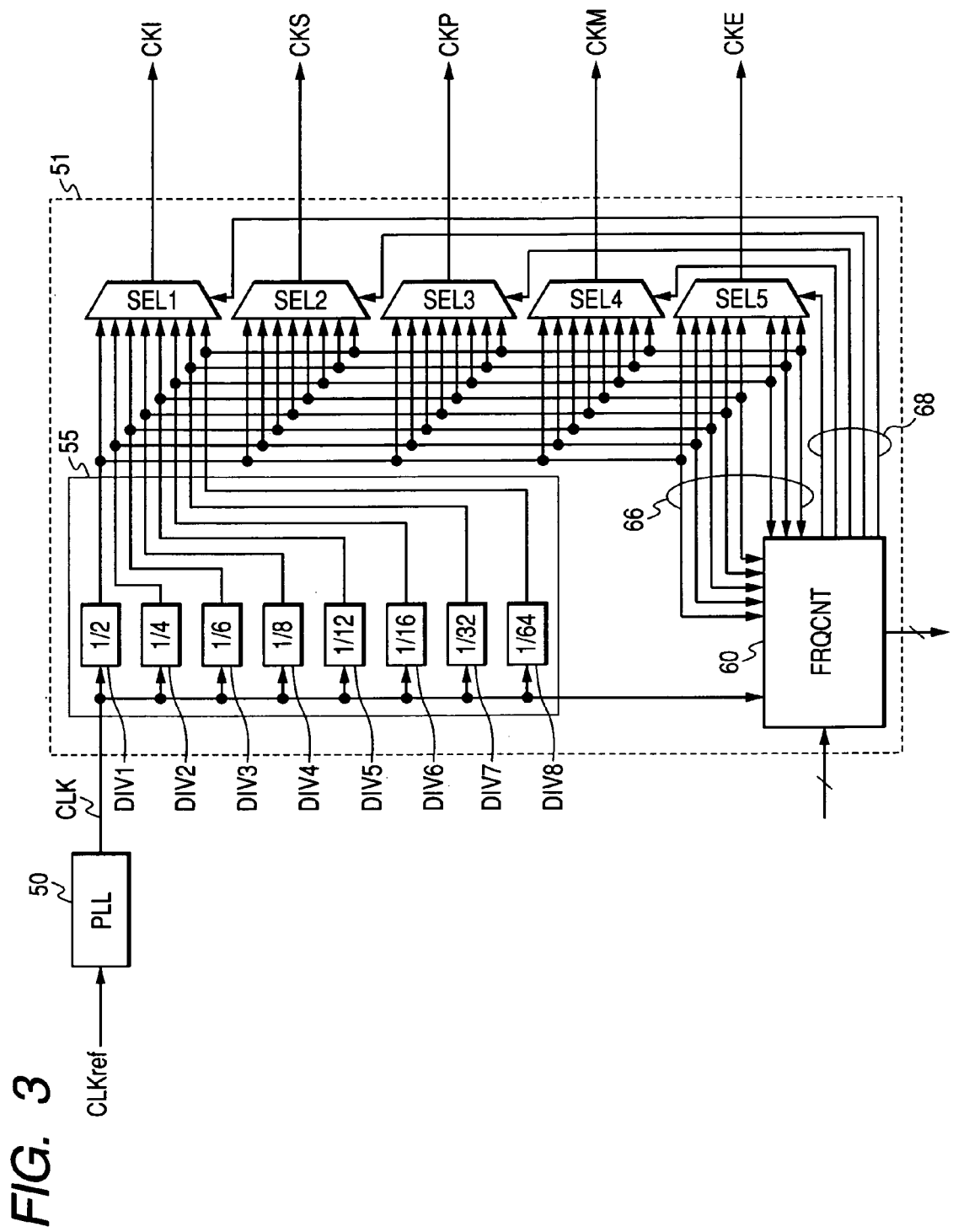
FIG. 3 is a logical circuit diagram exemplifying in detail a dividing circuit and a clock selection circuit in the clock generation circuit.

FIG. 2 shows a specific example of the clock generation circuit 3. FIG. 3 exemplifies in detail a dividing circuit and a clock selection circuit in the clock generation circuit 3.

The clock generation circuit 3 is broadly divided into an oscillation circuit 52 and a control section 53. The oscillation circuit 52 comprises a selector 54, a dividing circuit 55, a clock selection circuit 56, an output gate 57, a PLL circuit 58, and a selector 59. The PLL circuit 50 multiplies the frequency of clock signal CLKref by 24, for example. Clock signal CLKref is supplied from a transducer connected to external terminals XTAL and EXTAL or from the external terminal EXTAL. The dividing circuit 55 has a plurality of dividing circuits with different division ratios. The clock selection circuit 56 has a plurality of selectors that select one of division clocks output from the dividing circuit 55. As exemplified in FIG. 3, the dividing circuit 55 has eight dividing circuits DIV1 through DIV8 respectively having division ratios of 1/2, 1/4, 1/6, 1/8, 1/12, 1/16, 1/32, and 1/64, although not limited thereto. As exemplified in FIG. 3, the clock selection circuit 56 comprises selectors SEL1 through SEL5 that select outputs from the dividing circuits DIV1 through DIV8. The selectors SEL1 through SEL5 each select one of outputs from the dividing circuits DIV1 through DIV8. CPU clock CKI works as a processor core's operation clock. Bus clock CKS works as a synchronization clock for data transfer and the like using the super highway bus 4. Peripheral module clock CKP works as a synchronization clock for circuit modules connected to the peripheral buses 21 and 22. Bus clock CKE works as a synchronization clock for the external bus. Memory clock CKM works as a synchronization clock for the memory. These clocks are generically referred to as CLKi in FIG. 1.

The output gate 57 comprises a plurality of AND gates, although not limited thereto, and works as an output gate for the oscillation-controlled clocks CKI, CKS, CKP, CKM, and CKE. For the sake of convenience, outputs from the AND gate are also denoted as CKI, CKS, CKP, CKM, and CKE. The PLL circuit 58 multiplies the memory clock CLKM to generate DDR-SDRAM's synchronization clock CKD (which is provided to the DDR-SDRAM coupled to outside of the image processor). The selectors 54 and 59 provides routing in test mode to permit tests that directly use external clocks without using the PLL circuits 50 and 58. The selectors 54 and 59 have no direct relationship to the present invention.

The control section 53 comprises a frequency control circuit (FRQCNT) 60, an output control circuit (OUTCNT) 61, a frequency control register (FRQCR) 62, a PLL control register (PLLCR) 63, and a bus interface (BUSIF) 64.

The frequency control circuit 60 receives the division clock 66 from the dividing circuit 55 and the output clock CLK from the PLL circuit 50 to generate a selection signal 68 for the clock selection circuit 56. In addition, the frequency control circuit 60 receives reset signal RST, power-down signal PDN, mode signal MDi, standby signal stb, and output from a register 62. The frequency control circuit 60 outputs internal reset signal rst, internal power-down signal pdn, and a control signal 69 to the output control circuit 61. The reset signal RST, the power-down signal PDN, and the mode signal MDi work as external signals for the image processor. The standby signal stb is an internal signal enabled when the CPU 11 executes a standby instruction. The internal reset signal rst is used to initialize internal circuits. The internal power-down signal pdn is used to turn off a power supply circuit.

The output control circuit 61 receives reset signal RST, power-down signal PDN, standby signal stb, and a control signal 69. The output control circuit 61 provides control to enable or disable the output gate 57 from outputting the clocks CKI, CKS, CKP, CKM, and CKE. The output control signals are marked with the reference numeral 70.

The frequency control register 62 is configured to enable only a bit to set the frequency division ratio for the external bus clock CKE. The logic of the frequency control circuit 60 determines the other clock's frequencies. The PLL control register 63 is configured to enable control bits to turn on or off the PLL circuit 58 and stop outputting the clock CKE. The logic of the output control circuit 61 enables or disables output of the other clocks CKI, CKS, CKP, and CKM. The CPU 11 accesses the registers 62 and 63 via the second peripheral bus 22.

As shown in FIG. 3, the dividing circuit 55, the clock selection circuit 56, and the frequency control circuit 60 are considered to be the divider 51.

Figure 4:
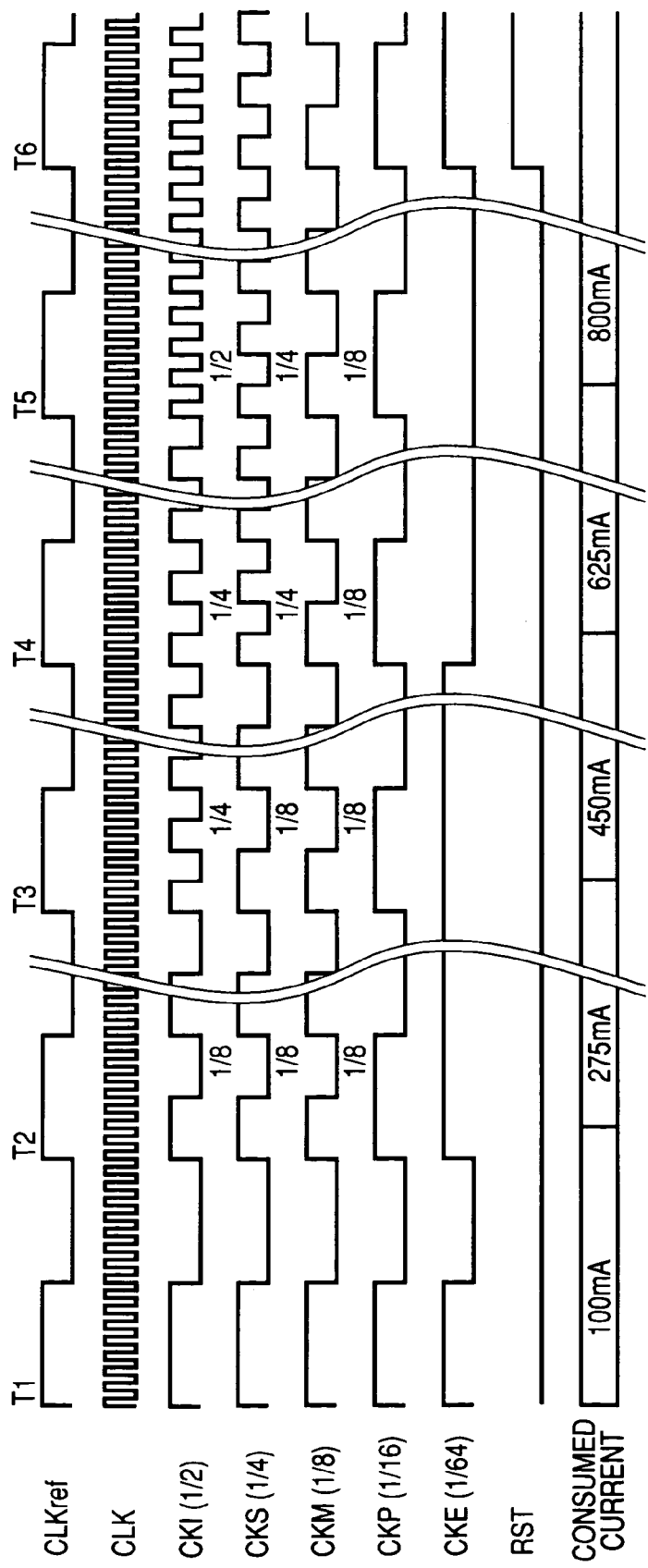
FIG. 4 is a timing chart exemplifying operation timings of a divider that provides stepwise frequency control during a power-on reset period of the image processor.

FIG. 4 exemplifies operation timings of the divider when the image processor recovers from a power-on reset period or a standby state.

A stabilization period for the PLL circuit 50 takes effect up to cycle T1. Clocks CKI, CKS, CKP, CKM, and CKE are supplied with clocks having the same frequency as clock CLKref. In this example, division ratio 1/16 is initially selected for clocks CKI, CKS, CKP, CKM, and CKE. At this time, a consumption current value is set to approximately 100 mA, for example. Up to cycle T2, the PLL circuit 50 stabilizes to select specified frequencies for clocks CKM, CKP, and CKE. Clocks CKI and CKS are supplied with clocks of division ratio 1/8 (slower than the specified clock). At this time, the consumption current value increases to 275 mA, for example. After a given period, only clock CKS is changed to division ratio 1/4 at cycle T3. At this time, the current value further increases to 450 mA, for example. After another given period, clock CKS is changed to a specified frequency at cycle T4. At this time, the current value is set to 625 mA, for example. Finally, after yet another given period, clock CKI is changed to a specified frequency at clock T5. At this time, the current value is set to 800 mA. The control logic to change clock frequencies is so designed as to provide a consumption current increment of 175 mA when each frequency is changed stepwise. In ordinary power supply circuits, it becomes possible to suppress a voltage drop less than or equal to 100 mV.

Stabilization of the PLL circuit 50 can be detected in such a manner that the frequency control circuit 60 counts output frequencies of the PLL circuit 50. A control signal is used to notify the stabilization of the PLL circuit 50 to the output control circuit 61. Until notified, the output control circuit 61 disables the output gate 57 from outputting clocks CKI, CKS, CKP, CKM, and CKE to prevent unnecessary currents from being supplied at transient stages.

After clocks CKI, CKS, CKP, CKM, and CKE stabilize at intended frequencies, the frequency control circuit 60 releases internal reset signal rst at cycle T6. After this point, the image processor starts processing data in synchronization with clocks CKI, CKS, CKP, CKM, and CKE according to a specified sequence.

The above-mentioned operation timings function the same as when the standby state exits (is released). In the standby state, the output gate 57 is disabled from outputting clocks CKI, CKS, CKP, CKM, and CKE, although not limited thereto. When standby signal stb is issued to release the standby state, the frequency control circuit 60 changes frequencies of clocks CKI, CKS, CKP, CKM, and CKE from low to high frequencies in the same manner as shown in FIG. 4. Under the condition that the PLL circuit 50 is stabilized, the output control circuit 61 enables output of clocks CKI, CKS, CKP, CKM, and CKE.

When the image processor recovers from the power-on reset period or the standby state, the frequency control circuit 60 controls the selection circuit 56 to select output states of the dividing circuit 55 so as to stepwise change frequencies of clock signals CKI, CKS, CKP, CKM, and CKE from low to high frequencies. This makes it possible to suppress a sudden current change when releasing the power-on reset or standby state. Consequently, the system using the image processor can easily stable the power supply and operate satisfactorily using the low-cost power supply circuit construction.

Figure 5:
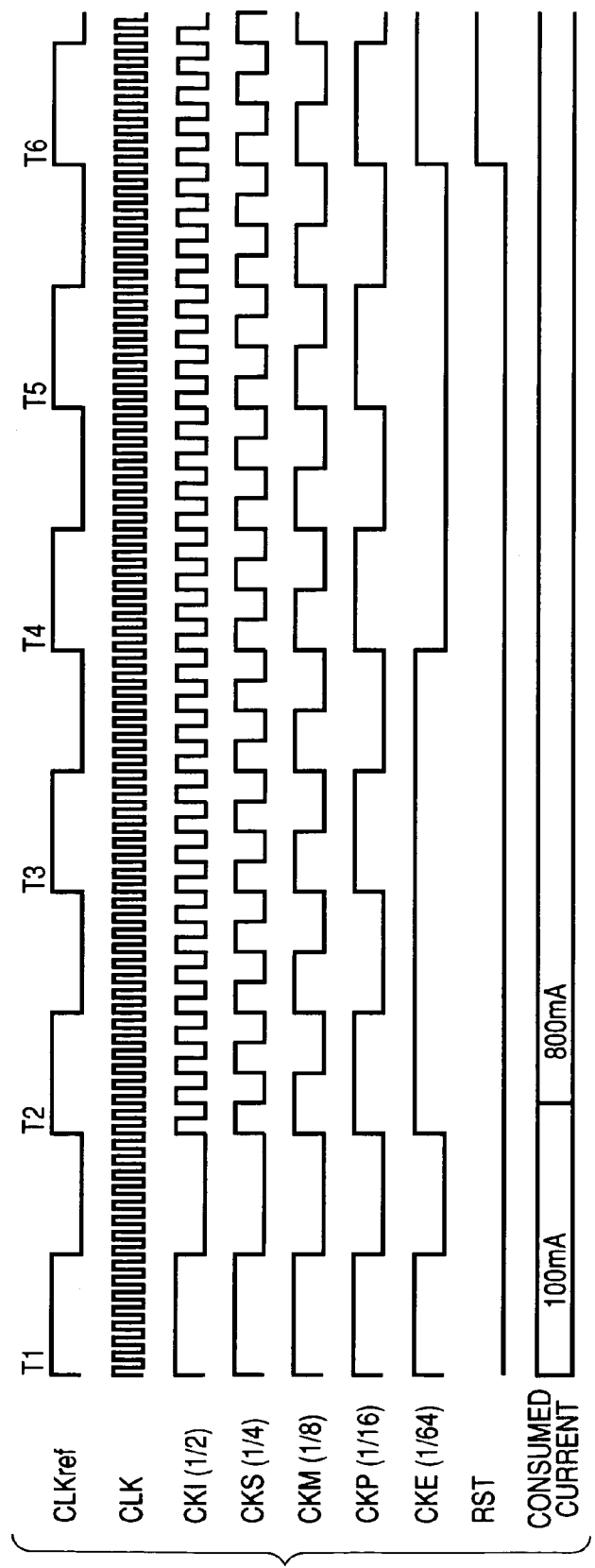
FIG. 5 is a timing chart, for comparison, exemplifying operation timings of the divider that provides no stepwise frequency control during a power-on reset period of the image processor.

FIG. 5 shows a timing chart as a comparative example when no stepwise frequency control is provided. A stabilization period for the PLL circuit 50 takes effect up to cycle T1. Clocks CKI, CKS, CKP, CKM, and CKE are supplied with clocks having the same frequency as reference clock CLKref. At this time, a consumption current value is set to approximately 100 mA, for example. The PLL circuit 50 stabilizes up to cycle T2. When clocks supplied to the modules are suddenly changed to specified values, the current value is set to 800 mA, suddenly increasing the consumption current 700 mA. According to the normal power supply circuit construction, increasing the current in this manner drops the power supply voltage approximately 300 to 600 mA throughout the system, for example. When the image processor uses the 1.2 V operating voltage for the PLL circuit and the circuit modules, the power supply voltage drops approximately 50% in the worst case, for example. As a result, the system operates unstably and the PLL circuit malfunctions. If the above-mentioned stepwise frequency control is not used, a solution for the voltage drop needs to dispose an expensive power supply IC and expensive, large-sized capacitors according to the current distribution in the system. As a countermeasure for such voltage drop, it may be possible to greatly delay the reset release until the power supply stabilizes. However, the delay is too long to be practical. The above-mentioned stepwise frequency control can solve these problems.

Figure 6:
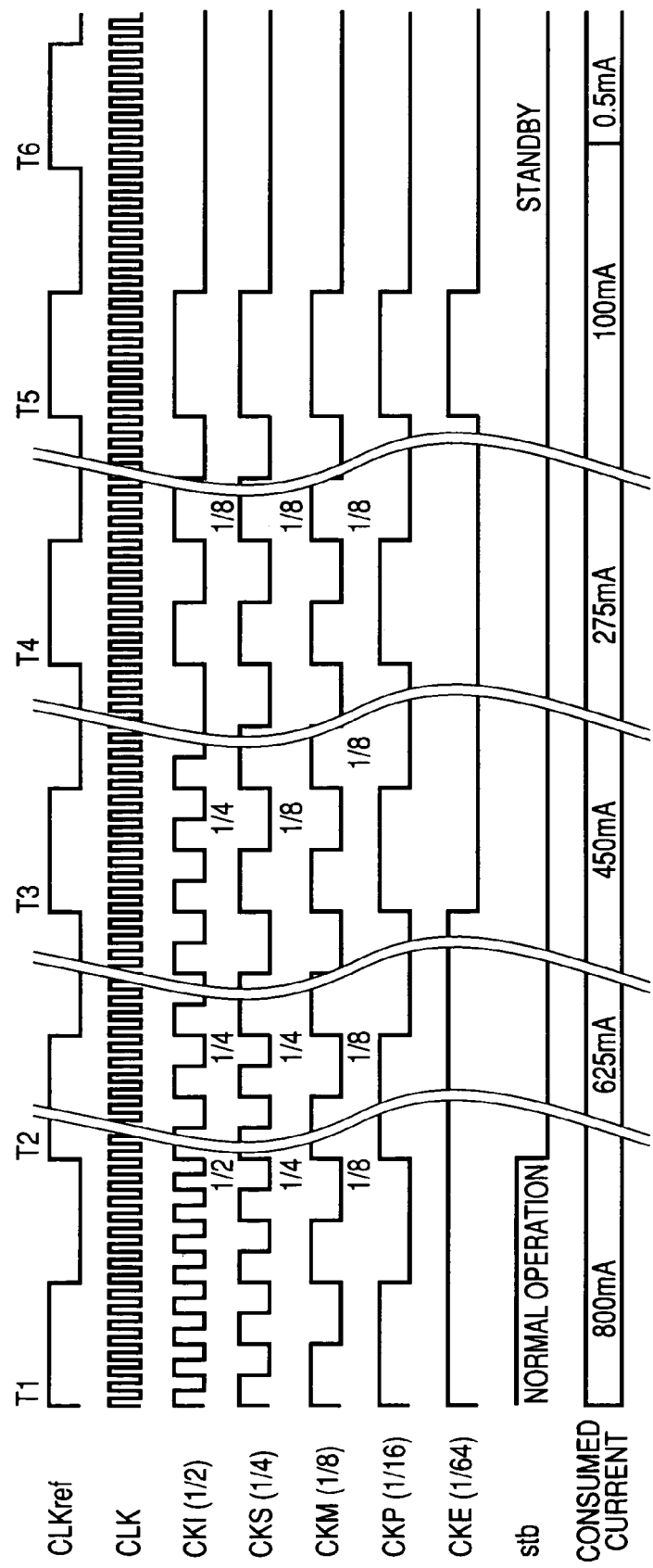
FIG. 6 is a timing chart exemplifying operation timings of the divider that provides stepwise frequency control when the image processor goes into standby state.

FIG. 6 exemplifies the divider's operation timings when the image processor goes into power-down or standby state. During a normal operation, division ratios are set to 1/2 for clock CKI, 1/4 for clock CKS, 1/8 for clock CKM, 1/16 for clock CKP, and 1/64 for clock CKE. When standby signal stb enables the standby state, the division ratio for clock CKI first changes to 1/4 to decrease the consumption current to 625 mA contrary to the example in FIG. 4. The division ratio for clock CKS then changes to 1/8 to decrease the consumption current to 450 mA. The division ratio for clock CKI then changes to 1/8 to decrease the consumption current to 275 mA. All clocks CKI, CKS, CKM, CKP, and CKE change to the frequency of reference clock CLKref to decrease the consumption power to 100 mA. At cycle T6 later on, the gate 57 is closed to establish the standby state.

During transition to a power-down state, operation timings are similar to those in FIG. 6. When power-down signal PDN enables the power-down state, the frequency control circuit 60 then stepwise changes the frequencies of clocks CKI, CKS, CKP, CKM, and CKE from high to low frequencies. At cycle T6, internal power-down signal pdn is issued to force an internal power supply circuit (not shown) to turn off the operating power supply.

When the image processor changes to the power-down or standby state, the frequency control circuit 60 controls the selection circuit 56 to select output states of the dividing circuit 55 so as to stepwise change frequencies of clock signals CKI, CKS, CKP, CKM, and CKE from high to low frequencies. This makes it possible to suppress a sudden current change when enabling the power-on reset or standby state. Also in this case, the system using the image processor can easily stable the power supply and operate satisfactorily using the low-cost power supply circuit construction.

Figure 7:
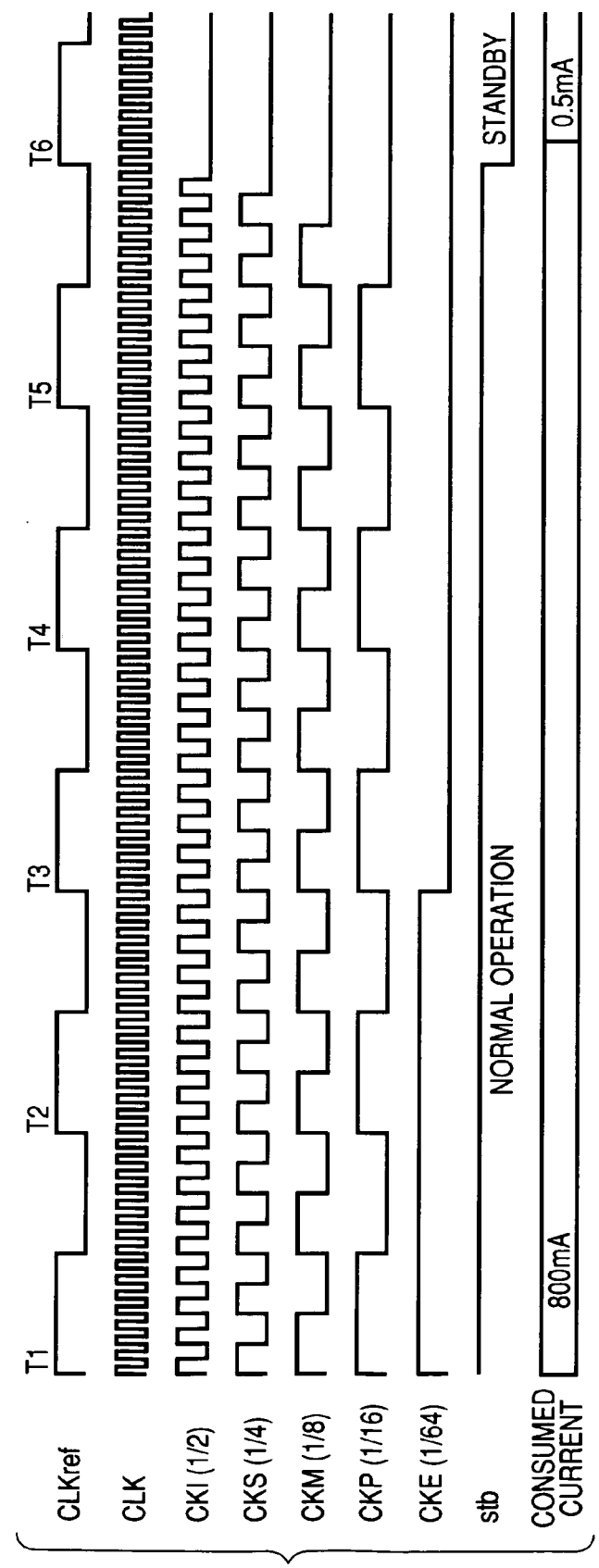
FIG. 7 is a timing chart, for comparison, exemplifying operation timings of the divider that provides no stepwise frequency control when the image processor goes into standby state.

FIG. 7 shows a timing chart as a comparative example when no stepwise frequency control is provided. When the image processor changes to the standby state at cycle T6, the clocks are set to fixed levels (low or high levels). For example, the current consumed 800 mA during a normal operation suddenly changes to 0.5 mA. According to the normal power supply circuit construction, this current phenomenon causes the power supply voltage to increase approximately 300 to 600 mA throughout the system, for example. When the operating voltage is 1.2 V, the power supply voltage drops approximately 50% in the worst case, causing malfunction and shortening the device life.

Figure 8:
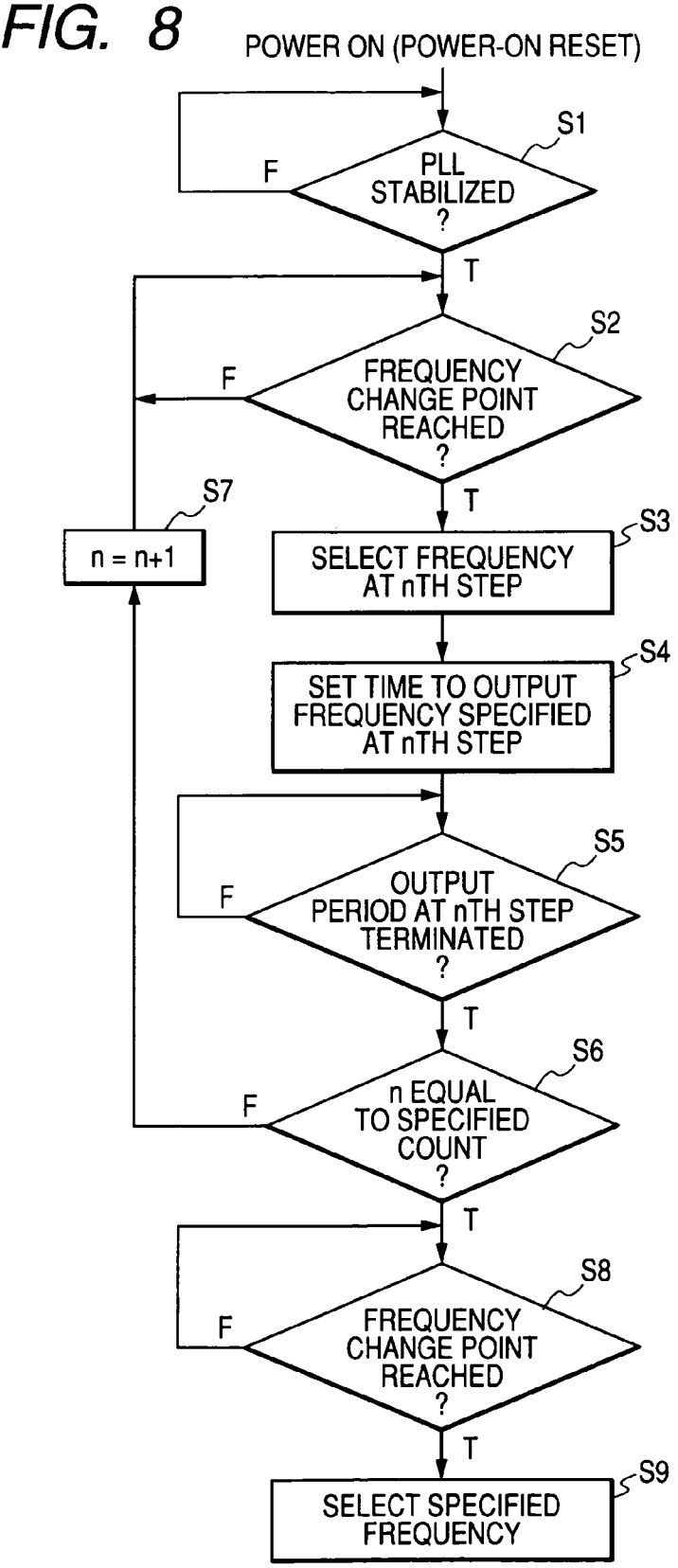
FIG. 8 is a flowchart showing a frequency step-up control process in a frequency control circuit.

FIG. 8 exemplifies a frequency step-up control process in the frequency control circuit 60 described with reference to FIG. 4. When a power-on reset instruction is issued, the process waits until output from the PLL circuit 50 stabilizes (S1). After output from the PLL circuit 50 stabilizes, the process determines whether or not the frequency change point is reached (S2). In FIG. 8, F denotes false and T denotes true. As shown in FIG. 10, the frequency change point is defined as a timing (reference timing) that aligns rising edges of the division clocks having division ratios 1/2, 1/4, 1/6, 1/8, 1/12, and 1/16. The process selects a step-up frequency to be specified for the nth step at this timing (S3). The process further specifies the time to output the frequency specified for the nth step (S4). The process waits until the specified output time elapses (S5). The output time specified at S4 should be equivalent to the number of occurrences of the reference timing as described with reference to FIG. 10. At S5, it just needs to monitor the specified number of occurrences of the reference timing. When the output time at S5 elapses, the process determines whether or not n reaches the specified number of times (S6). When the result is false, the process assigns n+1 to n and then returns to S2. The process is repeated from S2 to S6 until n reaches the specified number of times (S7). When n reaches the specified number of times at S6, the process waits until the last frequency change point is reached (S8). The process finally steps up the frequency selection for the required clock (S9) so that all the clock frequencies satisfy the required frequency. For restoration from the power-on reset period or the standby state, this control process can stepwise change the frequencies of clock signals CKI, CKS, CKP, CKM, and CKE from low to high frequencies. The control process in FIG. 8 can be implemented by a state machine comprising logic gates, counters, and the like. It is unpreferable to use the CPU's software control. This is because the function needs to be implemented during a reset period or in a condition before restoration from the standby state.

Figure 9:
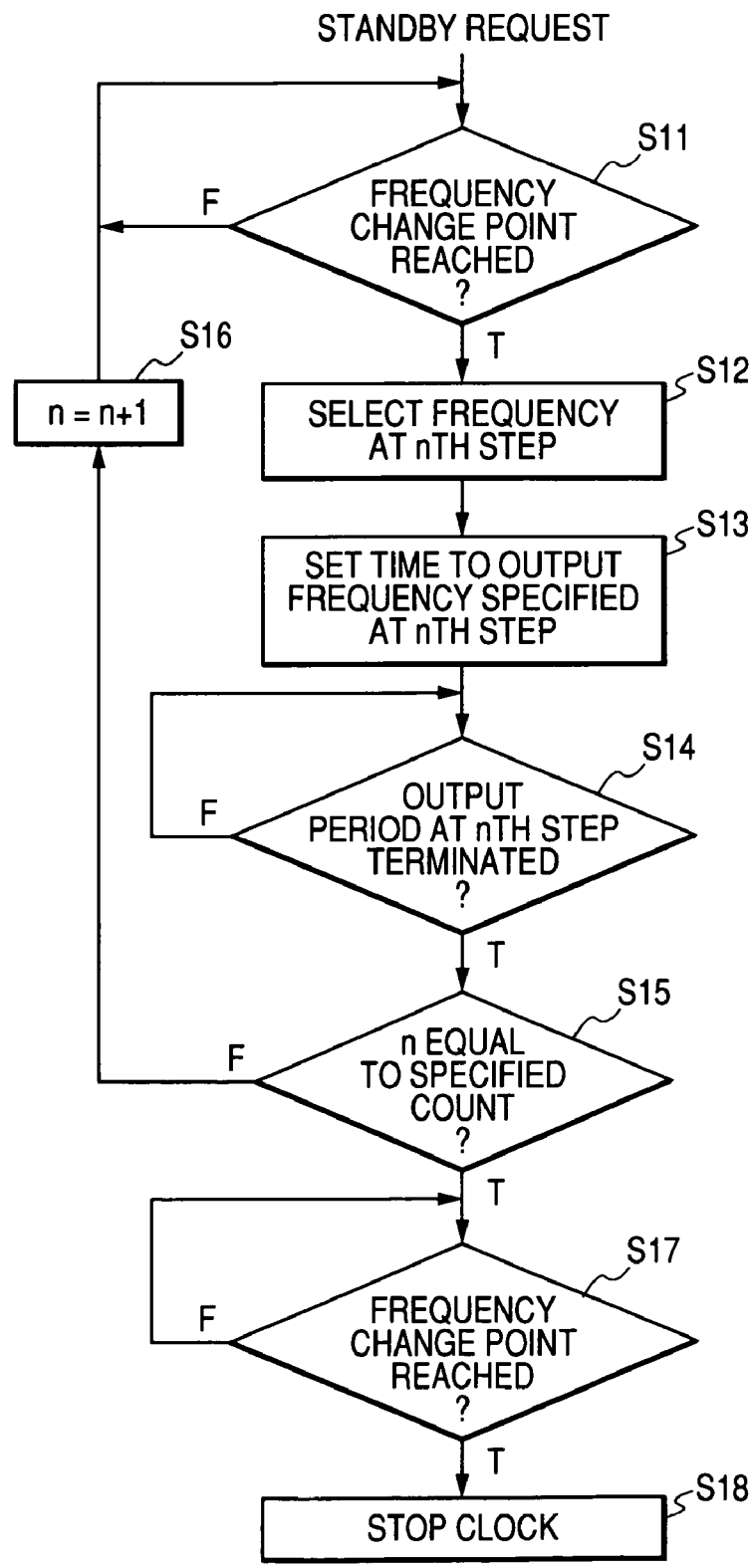
FIG. 9 is a flowchart showing a frequency step-down control process in the frequency control circuit.

FIG. 9 exemplifies a frequency step-down control process in the frequency control circuit 60. When receiving a standby request, the process determines whether or not the frequency change point is reached (S11). As shown in FIG. 10, the frequency change point is defined as a timing (reference timing) that aligns rising edges of the division clocks having division ratios 1/2, 1/4, 1/6, 1/8, 1/12, and 1/16. The process selects a step-down frequency to be specified for the nth step at this timing (S12). The process further specifies the time to output the frequency specified for the nth step (S13). The process waits until the specified output time elapses (S14). The output time specified at S14 should be equivalent to the number of occurrences of the reference timing as described with reference to FIG. 10. At S14, it just needs to monitor the specified number of occurrences of the reference timing. When the output time at S14 elapses, the process determines whether or not n reaches the specified number of times (S15). When the result is false, the process assigns n+1 to n and then returns to S11. The process is repeated from S11 to S15 until n reaches the specified number of times (S16). When n reaches the specified number of times at S15, the process waits until the last frequency change point is reached (S17), and then stops outputting clocks (S18). For transition to the power-down or the standby state, this control process can stepwise change the frequencies of clock signals CKI, CKS, CKP, CKM, and CKE from high to low frequencies. The control process in FIG. 9 can be implemented by a state machine comprising logic gates, counters, and the like. It is unpreferable to use the CPU's software control for the reason as mentioned above.

There may be considerations about a ratio of frequencies to be stepped up or down and about the length of an interval to change frequencies. These can be best determined individually according to the circuit module's power consumption for each clock, the current supply capability of the power supply for the system equipped with the image processor, and the like. Alternatively, it is possible to predetermine the current supply capability of an external power supply needed for the image processor. This current supply capability may be taken into account together with the circuit module's power consumption for each clock to determine the above-mentioned considerations. In this case, a complete custom design can be avoided.

While there have been described specific preferred embodiments of the present invention made by the inventors, it is to be distinctly understood that the present invention is not limited thereto but may be otherwise variously embodied within the spirit and scope of the invention.

For example, the processor core may be replaced by the CPU. This is because FPU, MMU, and CACH are omissible. The present invention can be widely applied not only to car-navigation data processors, but also the other special-purpose microcomputers and microprocessors for built-in devices, general-purpose microcomputers and microprocessors, and the other system-on-chip data processors.

What is claimed is:

1. A data processor comprising:
   a clock pulse generation circuit; and
   a circuit module operating on a clock signal output from said clock pulse generation circuit;
   wherein said clock pulse generation circuit stepwise changes frequencies of said clock signal from low to high frequencies, when a power-on reset is released according to input of a reset signal to said data processor from outside;
   wherein said clock pulse generation circuit comprises a PLL circuit and a divider;
   wherein said divider comprises a plurality of dividing circuits, a selection circuit to select outputs from said dividing circuit, and a frequency control circuit to control said selection circuit;
   wherein, upon release from said power-on reset, said frequency control circuit controls said selection circuit to select output states of said dividing circuit so as to change a frequency of said clock signal from a low frequency to a high frequency in a stepwise manner;
   wherein said circuit module includes a central processing unit; and
   wherein said circuit module includes an asynchronous DRAM controller, a display controller, and a rendering controller.

2. The data processor according to claim 1, wherein, upon entry to a power to a power-down or standby state, said frequency control circuit further controls said selection circuit to select output states of said dividing circuit so as to change the frequency of said clock signal from the high frequency to the low frequency in a stepwise manner.

3. The data processor according to claim 1, wherein, upon entry to a standby state, said clock pulse generation circuit changes the frequency of said clock signal from the high frequency to the low frequency in a stepwise manner.

4. The data processor according to claim 1,
   wherein said frequency control circuit responds to a standby signal from said data processor, and executes said stepwise change of a frequency of said clock signal from the high frequency to the low frequency;
   wherein when said frequency control circuit detects said clock signal has reached a predetermined low frequency, said frequency control circuit stops supplying clock signals to said circuit module.

5. The data processor according to claim 1,
   wherein said frequency control circuit executes a process to stepwise change frequencies of said clock signal from the high frequency to low frequency according to a power-down signal and then executes a power-down state.

* * * * *